United States Patent [19]

Haraguchi

[11] Patent Number: 5,040,516

[45] Date of Patent: Aug. 20, 1991

[54] DOUBLE-TUB FUEL TANK

[75] Inventor: Teruo Haraguchi, Ohta, Japan

[73] Assignee: Fuji Jukogyo Kabushiki Kaisha, Tokyo, Japan

[21] Appl. No.: 580,634

[22] Filed: Sep. 7, 1990

[30] Foreign Application Priority Data

Oct. 20, 1989 [JP] Japan .................. 1-274591

[51] Int. Cl.$^5$ ............................. F02M 55/02
[52] U.S. Cl. .................. 123/509; 123/514; 123/510; 137/262; 137/265; 137/565
[58] Field of Search ........... 123/509, 510, 514, 511; 137/565, 262, 265

[56] References Cited

U.S. PATENT DOCUMENTS

| 2,840,147 | 6/1958 | Almestad | 137/265 |
| 3,605,774 | 9/1971 | Launay et al. | 137/565 |
| 3,884,255 | 5/1975 | Merkle | 137/565 |
| 4,297,846 | 11/1981 | Cadeddu | 137/262 |
| 4,506,986 | 3/1985 | Freeman | 137/565 |
| 4,650,339 | 3/1987 | Chetcuti et al. | 137/565 |
| 4,651,701 | 3/1987 | Weaver | 123/509 |
| 4,763,633 | 8/1988 | Nakanishi | 123/509 |
| 4,838,307 | 6/1989 | Sasaki et al. | 123/514 |
| 4,844,704 | 7/1989 | Jiro | 123/509 |
| 4,989,572 | 2/1991 | Giacomazzi et al. | 123/509 |

FOREIGN PATENT DOCUMENTS 63-140163  9/1988  Japan .

Primary Examiner—Carl Stuart Miller
Assistant Examiner—Thomas N. Moulis
Attorney, Agent, or Firm—Martin A. Farber

[57] ABSTRACT

A projection is provided in a fuel tank for dividing the fuel tank into two tubs. A supporting member is secured on a top of the projection. A fuel pump and a fuel metering device are securely mounted on the supporting member. A service hole is formed in the wall of the fuel tank opposite to the supporting member for inspecting the fuel pump.

4 Claims, 5 Drawing Sheets

DOUBLE-TUB FUEL TANK

BACKGROUND OF THE INVENTION

The present invention relates to a fuel tank for an automotive engine, having two tubs.

Japanese Utility Model Application Laid-Open 63-140163 discloses such a fuel tank as a bottom of a body thereof has a projection dividing the tank into two tubs. In a first tub, a fuel pump communicated with a delivery line of the fuel for the engine is provided. In a second tub, a transfer pump for transferring the fuel therein to the first tub is disposed. Service holes for each pump are formed on a upper wall of the body. Each pump is supported by a stay provided on a cap for the hole. Consequently, many parts are required in the tank. In addition, since the service holes must be sealed, maintenance of the seal is troublesome. The stays must be sufficiently rigid, so that weight of the tank increases.

Furthermore, the caps, which are supporting members of the auxiliary devices such as the fuel pump and the transfer pump of the fuel tank, are not integral with the body. Therefore, each position of the auxiliary devices changes depending on positions of the caps. Hence it is difficult to accurately position the auxiliary members.

SUMMARY OF THE INVENTION

The object of the present invention is to provide a fuel tank where numbers of parts and manufacturing process and weight thereof are reduced, and auxiliary devices of the tank may be accurately disposed.

According to the present invention, there is provided a double-tub fuel tank having a projection for dividing the fuel tank into two tubs, comprising a supporting member secured on a top of the projection, and the auxiliary devices securely mounted on the supporting member. A service hole is formed in a wall of the fuel tank opposite to the supporting member, and a cap is secured to the fuel tank for closing the service hole.

In an aspect of the invention, the auxiliary devices include a fuel pump and a fuel metering unit, pipes for the fuel pump are adapted to pass through the holes formed in the cap. The fuel tank and the supporting member are made of plastics and secured with each other by hot welding. The auxiliary devices are secured to the supporting member by dovetail engagement.

The other objects and features of this invention will become understood from the following description with reference to the accompanying drawings.

DETAILED DESCRIPTION OF THE PREFERRED EMBODIMENTS

Figure 1:
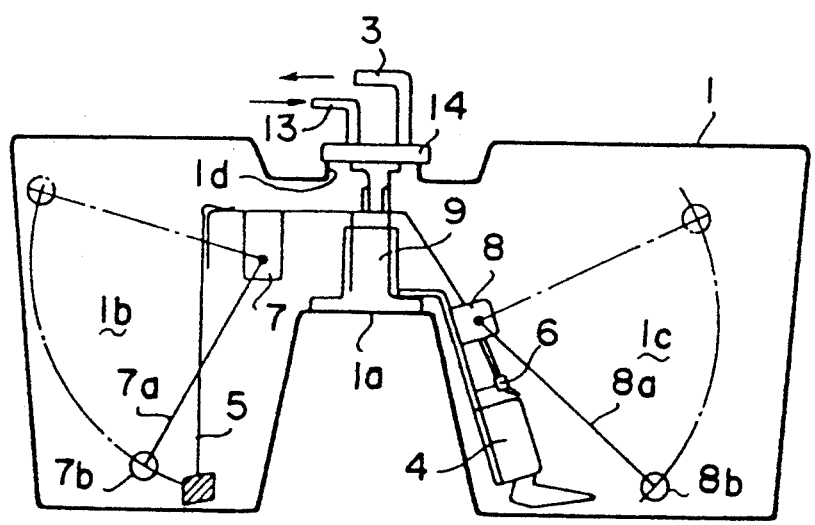
FIG. 1 is a schematic diagram of a first embodiment of a fuel tank according to the present invention.
Figure 2:
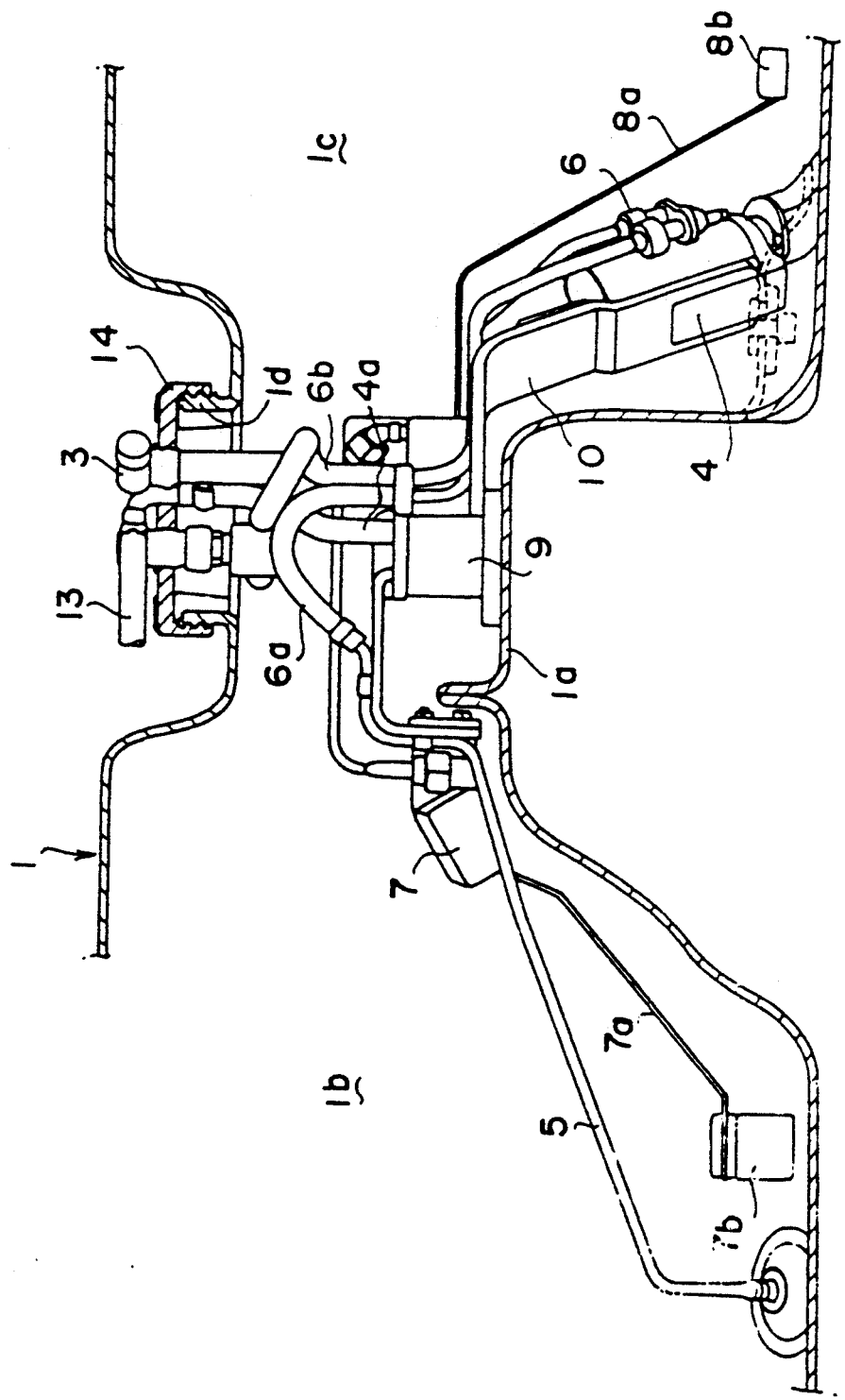
FIG. 2 is a sectional view showing a part of the fuel tank.
Figure 4:
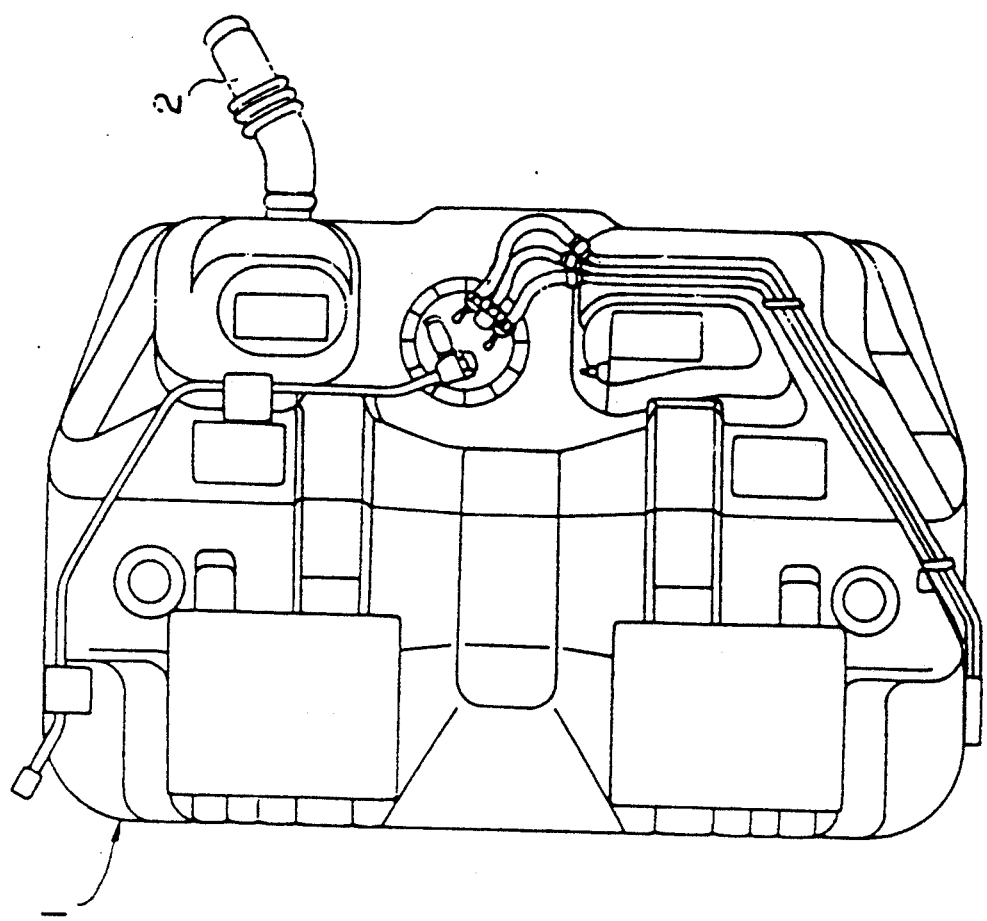
FIG. 4 is a plan view of the fuel tank.
Figure 3:
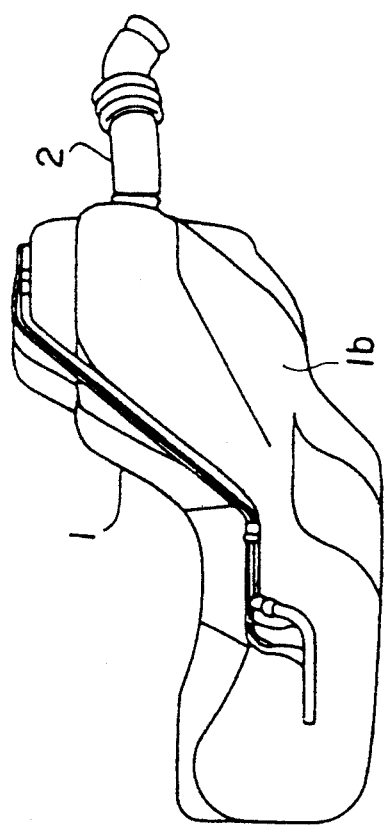
FIG. 3 is an elevational view of the fuel tank.

Referring to FIGS. 1 to 4, a fuel tank made of plastics is disposed along the underside of a floor panel of a motor vehicle. A longitudinal protrusion 1a is provided at a central position of the bottom of a body 1, thereby dividing the body 1 into a left tub 1b and a right tub 1c. A propeller shaft of the vehicle passes through a space under the protrusion 1a. The right tub 1c is communicated with a filler pipe 2 at the rear thereof (FIGS. 3 and 4).

A fuel pump 4 and a jet pump 6 are provided in the right tub 1c as auxiliary devices of the tank. The fuel pump 4 is connected to a delivery pipe 3 through a fuel pipe 4a (FIGS. 2 and 5) and the jet pump 6 is communicated with a transfer pipe 5 provided in the left tub 1b through an intake pipe 6a so as to transfer the fuel from the left tub 1b to the right tub 1c. The jet pump 6 is connected to a return pipe 13 from fuel injectors (not shown) through a pipe 6b. Metering units 7 and 8 having float arms 7a, 8a and floats 7b, 8b are provided in the tubs 1b and 1c, respectively, for individually detecting quantity of fuel in each tub.

Figure 5:
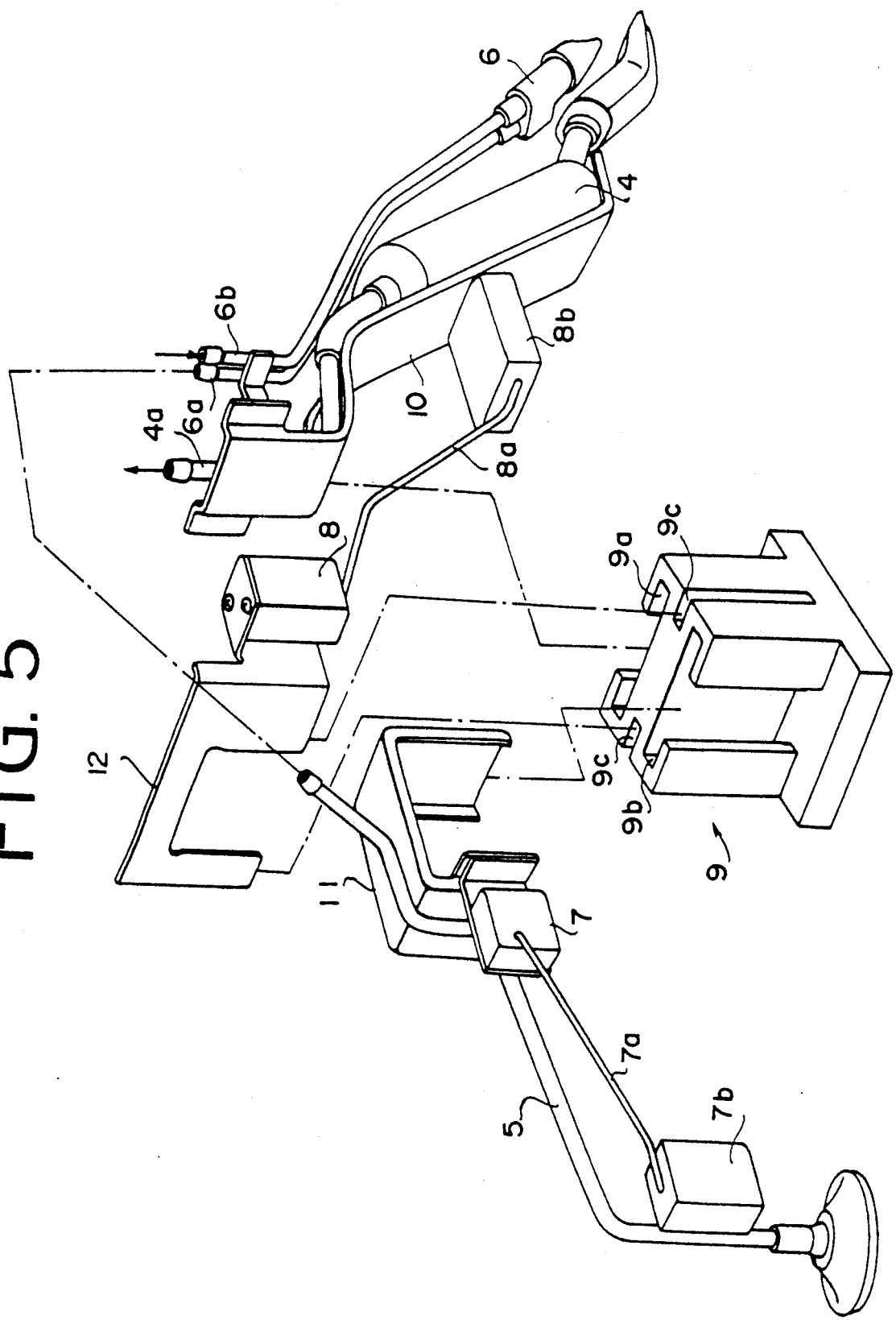
FIG. 5 is an exploded perspective view showing a supporting member and auxiliary devices of the fuel tank.

A plastic supporting member 9 is fixed on the upper wall of the protrusion 1a by hot welding for supporting the auxiliary devices of the tank at respective predetermined positions. Referring to FIG. 5, the support member 9 has a first vertical dovetail groove 9a facing the right tub, a second vertical dovetail groove 9b facing the left tub 1b and a pair of vertical slits 9c. A first bracket 10 on which the fuel pump 4 and the fuel pump 6 are attached is engaged in the first groove 9a and attached thereto. A second bracket 11 is engaged with the second groove 9b. The left metering unit 7 and the transfer pipe 5 are securely mounted on the second bracket 11. In the slits 9c, legs of a third bracket 12 carrying the right metering unit 8 are inserted. By thus mounting the first to third brackets 10, 11 and 12 to the support member 9, the auxiliary members of the tank are placed at the predetermined positions in the right and the left tubs 1c and 1b.

As shown in FIGS. 1 and 2, the tank body 1 has a service hole 1d at an upper center portion thereof opposite the protrusion 1a for inspecting, adjusting and replacing the auxiliary devices. The service hole 1d opposes a check hole (not shown) which is provided in a floor panel of the vehicle body. The service hole 1d is covered by a screw cap 14 through which the delivery pipe 3 and the return pipe 13 pass.

In operation, the fuel in the right tub 1c is applied to the injectors of the engine by the fuel pump 4 through the fuel pipe 4a and the delivery pipe 3. A part of the fuel returns to the jet pump 6 through the return pipe 13 and the pipe 6b. The fuel in the left tub 1b is transferred to the right tub 1c by the jet pump 6 through the transfer pipe 5 and the intake pipe 6a. The quantities of the fuel in the tubs 1b and 1c are separately detected by the metering units 7 and 8, respectively.

Figure 6:
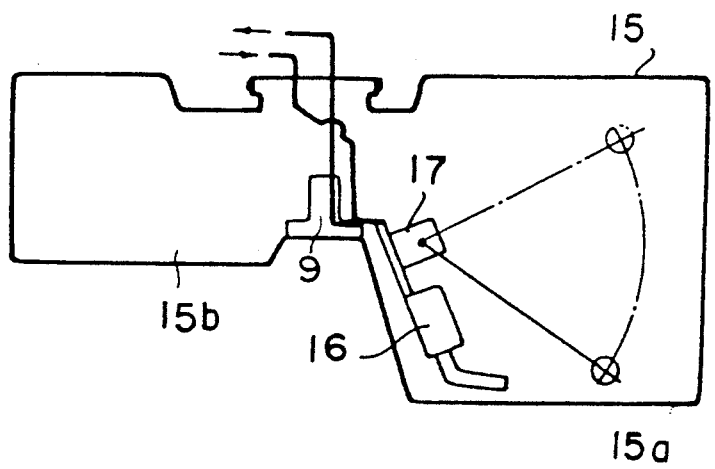
FIG. 6 is a schematic diagram of a second embodiment of the fuel tank of the present invention.

FIG. 6 shows a second embodiment of the fuel tank of the present invention. The fuel tank 15 comprises a deep tub 15a and a shallow tub 15b so that the transfer pump for transferring the fuel from one tub to the other is unnecessary. A fuel pump 16 and a metering unit 17 disposed in the deep tub 15a are mounted on the supporting member 9 in the same manner as in the first embodiment.

In the double-tub fuel tank according to the present invention, the auxiliary devices such as the fuel pump, transfer pump and fuel metering units are mounted inside the tank only by one supporting member. Hence two heavy stays used in a conventional tank for supporting the auxiliary devices are obviated so that the number of parts in the tank and the weight thereof are decreased. Since both the body of the fuel tank and the supporting member are made of plastics, the weight of the tank is reduced. The auxiliary devices are easily mounted on the supporting member by engaging the brackets on which auxiliary devices are attached with the grooves formed on the supporting member. Since there is only one service hole, which is covered by the cap, the sealing maintenance thereof becomes simplified than that of the conventional tank with two service holes. The supporting member is fixed to the protrusion so that the position of the auxiliary devices are accurately determined rather than changing the mounting position thereof in accordance with the position of the cap of the service hole. Only one check hole is necessary in the floor panel of the vehicle, thereby improving the rigidity thereof.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A double-tub fuel tank having a projection provided on a bottom of the fuel tank for dividing the fuel tank into two tubs, comprising:
   a supporting member secured on a top of said projection;
   auxiliary devices securely mounted on said supporting member;
   said fuel tank having a service hole opposite to said supporting member; and
   a cap secured to said fuel tank for closing said service hole.

2. The fuel tank according to claim 1, wherein said auxiliary devices include a fuel pump, a fuel metering unit and pipes for the fuel pump to pass through the hole formed in said cap.

3. The fuel tank according to claim 1, wherein said fuel tank and said supporting member are made of plastics and secured with each other by hot welding.

4. The fuel tank according to claim 1, wherein said auxiliary devices are secured to said supporting member by a dovetail engagement.

* * * * *